United States Patent [19]

Gorodissky et al.

[11] 4,147,366
[45] Apr. 3, 1979

[54] RUBBERIZED ROLL FOR THE SEALING DEVICE OF A HIGH PRESSURE APPARATUS

[75] Inventors: Leonid G. Gorodissky; Stanislav M. Evtikhovich, both of Moscow; Igor P. Grigoriev; Nikolai A. Kvashnin, both of Ivanovo; Vladislav I. Sokolov, Kursk; Larisa S. Chekreneva, Kursk; Rostislav G. Birdus, Kursk; Maria A. Zaitseva, Kursk; Jury T. Kryazhev, Kursk; Galina V. Kuzminova, Volzhsky Volgogradskoi oblasti, all of U.S.S.R.; Nikolai T. Romanov, deceased, late of Moscow, U.S.S.R., by Anastasia T. Romanov, administrator

[73] Assignee: Vsesojuzny Nauchno-Issledovatelsky i Experimentalny Institut po Perabotke Khimicheskikh Volokon, U.S.S.R.

[21] Appl. No.: 892,092

[22] Filed: Mar. 31, 1978

[51] Int. Cl.² .................... B08B 3/00; F16J 15/54
[52] U.S. Cl. .................... 277/22; 277/72 R; 277/75; 277/237 R; 277/DIG. 7; 68/5 E; 34/242
[58] Field of Search .................. 277/12, 22, 72 R, 74, 277/75, DIG. 7, 237 R; 68/5 R, 5 B, 5 E; 34/242

[56] References Cited

U.S. PATENT DOCUMENTS

| 3,081,821 | 3/1963 | Hamilton | 277/72 X |
| 3,299,676 | 1/1967 | Fujihashi | 277/237 R X |
| 3,546,902 | 12/1970 | Sando et al. | 68/5 E |
| 3,686,900 | 8/1972 | Sando et al. | 68/5 E |
| 3,829,103 | 8/1974 | Sussman | 277/75 X |

Primary Examiner—Robert S. Ward, Jr.
Attorney, Agent, or Firm—Steinberg & Blake

[57] ABSTRACT

A rubberized roll for the sealing device of a high-pressure apparatus comprises a shell with pins provided at both ends thereof and protruding with their enlarged portion thereinside, thus defining the shell interior. One of the pins is provided with a through axial duct for a cooling agent to feed into the shell interior while the other pin has a similar duct only in its enlarged portion. Provided at the ends of the enlarged portions are collars forming an annular cavity in each of said enlarged portions, said annular cavity being connected to the axial duct of the respective enlarged portion and to the shell interior. An annular groove for retaining the rubberizing material therein is cut in the outer end face of the collar located at the outer ends of each enlarged portion of the pin. Such a construction of the roller provides for a uniform cooling of the surface thereof and contributes to a reliable adhesion of the rubberizing material to the roll end faces.

2 Claims, 1 Drawing Figure

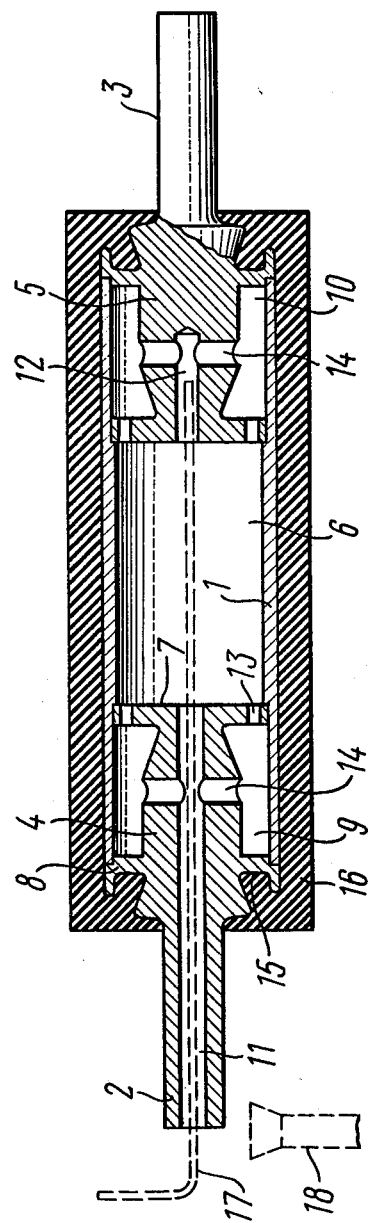

RUBBERIZED ROLL FOR THE SEALING DEVICE OF A HIGH PRESSURE APPARATUS

The present invention relates to high-pressure apparatus, and more particularly to rubberized rolls making part of roll sealing devices, and is most successfully applicable in high-pressure apparatus for the treatment of fabric.

The main component of roll sealing devices for hermetically sealing the slots through which the fabric enters and leaves the pressurized chamber is a pair of rolls rotating in contact with each other to transfer the fabric therebetween.

Hermetic sealing is provided by the use of sealing members contacting the rolls along the generating line and at the face ends thereof. The fabric under treatment transferred by the rolls, having thicker portions defined by the presence of seams, edges etc, the surface of the rolls must be rubberized, i.e., coated with an elastic material which permits said thicker portions to pass in between the rolls without deterioration of sealing. Currently, heat-resistant rubber-like materials are used as an elastic material bonded to the outer surface of the roll. To ensure the sealing of the roll end faces the elastic material is so applied to the roll cylindrical surface that part thereof should extend beyond the ends of the roll.

However, this extending part of the rubberizing elastic material, as being in tight contact with the end face sealing element is subjected during operation of the sealing device not only to compressive but also to shearing stresses which give rise to the spalling of said part of the elastic material from the end face of the roll and eventually to unsealing of the roll end faces.

A further improvement making it possible to reduce to some extent this disadvantage consists in coating with an elastic material not only the roll cylindrical surface, but also the end faces thereof (cf. U.S. Pat. No. 3,546,902, class 68-5).

However, such a construction fails to provide a reliable adhesion of the elastic material to the roll end faces. It takes place not only due to shearing stresses but also owing to the overheating of the roll end faces.

The present-day high-pressure fabric-treating apparatus operate within routine temperature range from 115° C. to 160° C., therefore the elastic material used for roll coating must be heat-resistant. Though sufficiently heat-resistant materials are available, they are partly deteriorated when used as a coating of the roll and, as a result, spall from the metallic surface of the roll. This takes place because of liberation of heat generated due to conversion of mechanical energy of rolling contact of the rubberized rolls pressed to each other, into heat energy. The elastic material, in particular rubber, having low thermal conductivity, the liberated heat is accumulated within the roll, whereby the temperature of the roll becomes higher than the temperature within the vessel. An excessively high temperature of the roll causes the spalling of the elastic material from the surface thereof.

To reduce the harmful effect of overheating forced cooling was used in the recent years by feeding a cooling agent into the the roll interior (cf. e.g., accepted Japanese Application No. 42-44978).

This roll includes a shell having pins at its both end faces for the roll to rotate. The enlarged portions of these pins protrude into the shell to form the end face members closing the interior of the shell. The pins are provided with ducts for the cooling agent to feed into the shell interior.

However, such a construction fails to provide a uniform cooling of the rubberizing material coating the roll, its end face members being rather massive for the sake of strength, thereby preventing heat removal process to occur.

It is essential that the elastic material heated under operation of the sealing device be uniformly cooled, due to elevated volumetric expansion ratio of the rubber-like materials used in common practice for roll coating. An uneven heating of the elastic material gives rise to its inadequate expansion so that the diameter of the roll ends increases more than that of the roll middle portion. This results in unwanted leakage of steam through the middle portion of the roll. To prevent the leakage, the roll must be pressed against the sealing elements more tightly, thus causing a premature wear on the rubberizing coating. This effect is especially undesirable at the ends of the roll, as the roll ends are exerted by the sealing elements not only along the generating line but also at the end faces thereof. If the heat is not removed at the roll ends the wear thereon is inevitable.

It is the main object of the present invention to provide a rubberized roll having improved performance characteristics due to cooling its surface in a uniform manner.

It is another object of the present invention to provide a reliable adhesion of the rubberizing elastic material to the roll end faces.

These and other objects are attained by providing a rubberized roll comprising a shell, pins permitting the roll rotation and having enlarged portions protruding into the shell of both ends thereof, thus closing the interior of the shell and provided with ducts for cooling agent to pass, wherein, according to the invention, the enlarged portion of each pin, inserted into the shell is provided with collars spaced somewhat apart and tightly pressed with their peripheral surfaces against the inner surface of the shell, thus forming in said enlarged portion an annular cavity communicated with the duct for a cooling agent to feed, and with the central portion of said shell interior.

Such a construction of the roll interior ensures the most efficient cooling of the roll end face members and a uniform cooling of the roll along the entire length thereof.

The most uniform cooling is obtained at a temperature near the boiling point of the cooling agent. In this case, with the aid of annular cavities, the cooling agent is supplied to the immediate vicinity of the end faces of the shell, thus providing the top uniformity of heat removal. It takes place because, in case of local overheating, the cooling agent boils up, the amount of heat consumed for this boiling-up being equal to that required to reduce the temperature of the overheated portion to the boiling point of the cooling agent.

The particular advantage of the present invention resides in the possibility of using waste condensate as a cooling agent, thus omitting special means for preheating the cooling agent to the temperature close to its boiling point.

The consumption of the cooling agent in this case is negligible because even its small amounts uptake much heat during the evaporation. There will be essentially no consumption of the cooling agent also if the cooling is carried out at the temperature below the boiling point of water and the vapour of the cooling agent is condensed by known stuffing boxes and a cooler.

At the same time, the collars spaced apart and arranged on the end face members provide for sufficient rigidity of the roll, preventing it from the action of great bending moments appearing in the apparatus during operation.

Besides, such a construction of the roll provided with the annular cavities formed in the enlarged portions of the pins and connected to the central portion of the shell interior ensures more reliable coating of the roll with the elastic material.

In the process of coating the outer surface of the roll with the rubberizing material, the steps of coating including a vulcanization of the coating in an autoclave, the annular cavities provided in the enlarged portions of the pins contribute to free access of vapour to the end portions of the shell, thus ensuring their uniform heating.

A good-quality vulcanization of these very portions is critical because exactly these portions take up the greatest loads both along the generating line and the end faces, whereby the deterioration of the rubberrizing coating of the roll in most cases starts from the face portions thereof.

It is expedient to cut an annular groove on the outer end face of each enlarged portion of the pin to obtain more reliable adhesion of the rubberizing elastic material to the end faces of the roll. These grooves should be preferably cut as an internal dovetail. The rubberizing elastic material filling the groove during the rubberizing process will be reliably retained on the end faces of the roll.

To promote understanding of the spirit and scope of the present invention, reference will hereinafter be made to the following description of a specific embodiment thereof given by way of illustration and the accompanying drawing which is a longitudinal-section view of the rubberized roll, according to the invention.

Referring now to the accompanying drawing the rubberized roll, according to the invention, comprises a metallic shell 1, pins 2 and 3 having enlarged portions 4 and 5 defining the central portion of an interior 6 of the shell 1. Each of the enlarged portions 4, 5 has a collar 7 located at its end facing the interior 6 of the shell 1, and a collar 8 located at its opposite end. Each pair of the collars 7 and 8, the enlarged portions 4 and 5 of the pins 2, 3, and the shell 1 form in combination annular cavities 9 and 10. The pin 2 is provided with an axial through duct 11. The pin 3 is provided with an axial duct 12. Each of the collars 7 is provided with through holes 13. Another holes 14 are made in each enlarged portion 4 and 5 between the collars 7 and 8. An annular groove 15 is cut on each collar 8, on its end face presented to the pins 2, 3. The outer surface of the roll is coated with an elastic material 16. A pipe 17 (shown with dotted lines) passes through the ducts 11 and 12 for feeding the cooling agent into the interior 6 of the roll. A funnel 18 (shown with dotted lines) for gathering the cooling agent is mounted near the end face of the pin 2.

The roll forming part of the sealing device of a high-pressure apparatus operates as follows. The cooling agent is delivered into the interior 6 of the shell 1 through the pipe 17 losely fitted within the duct 11 and fixed with its one end outside the roll, while its other end enters the duct 12. Said cooling agent is fed into the annular cavity 10 through the duct 14 in the enlarged portion 5, passes therefrom via the hole 13 in the collar 7 of the enlarged portion 5, then flows along the central portion of the interior 6 of the shell 1 and through the hole 13 in the collar 7 of the enlarged portion 4 finds its way into the annular cavity 9. The cooling agent via the hole 14 in the enlarged portion 4 further penetrates into the gap between the pipe 17 and the inner surface of the duct 11, and then runs from the duct 11 into the funnel 18.

While the invention has been described herein in terms of the preferred embodiment, numerous variations may be made in the roll illustrated in the drawing and herein described without departing from the scope and spirit of the invention as set forth in the appended claims.

What is claimed is:

1. A rubberized roll for the sealing device of a high-pressure apparatus, comprising:
   a shell;
   a first pin arranged at one end of said shell;
   a second pin arranged at the opposite end of said shell;
   said first and second pins having enlarged portions protruding into said shell at both ends thereof;
   said shell having an interior defined by said enlarged portions of said pins;
   said first pin having an axial through duct for a cooling agent to feed into said inner cavity;
   said enlarged portion of said second pin having an axial duct for the cooling agent to pass;
   said enlarged portions of said first and second pins having first collars located at the ends of said enlarged portions facing said inner cavity of said shell, and second collars located at the opposite ends of said enlarged portions, said first and second collars being tightly held up with their peripheral surfaces against the inner surface of said shell;
   said enlarged portions of said first and second pins having annular cavities defined between said first and second collars, said enlarged portions of said first and and second pins each being provided with a radial through duct between said first and second collars;
   said first collars having holes for said annular cavities to communicate with said interior of the shell.

2. A rubberized roll as claimed in claim 1, wherein each of said second collars is provided with an annular groove located on its outer surface with respect to said annular cavity to retain the rubberizing material therein, said annular grooves being shaped substantially as an internal dovetail.

* * * * *